Jan. 16, 1962 B. HOUSMAN 3,017,100

ADDER CIRCUIT

Filed Dec. 31, 1957 2 Sheets-Sheet 1

| X | Y | $S_h$ | $C_h$ | IN $C_f$ | $S_f$ | OUT $C_f$ |
|---|---|---|---|---|---|---|
| 0 | 0 | 0 | 0 | 0 | $0=S_h$ | $0=C_h$ |
| 0 | 1 | 1 | 0 | 0 | $1=S_h$ | $0=C_h$ |
| 1 | 0 | 1 | 0 | 0 | $1=S_h$ | $0=C_h$ |
| 1 | 1 | 0 | 1 | 0 | $0=S_h$ | $1=C_h$ |
| 0 | 0 | 0 | 0 | 1 | $1=\bar{S}_h$ | $0=C_h$ |
| 0 | 1 | 1 | 0 | 1 | $0=\bar{S}_h$ | $1=\bar{C}_h$ |
| 1 | 0 | 1 | 0 | 1 | $0=\bar{S}_h$ | $1=\bar{C}_h$ |
| 1 | 1 | 0 | 1 | 1 | $1=\bar{S}_h$ | $1=C_h$ |

INVENTOR.
BENNETT HOUSMAN

BY George Baron

ATTORNEY

Jan. 16, 1962 B. HOUSMAN 3,017,100

ADDER CIRCUIT

Filed Dec. 31, 1957

2 Sheets-Sheet 2

3,017,100
Patented Jan. 16, 1962

3,017,100
ADDER CIRCUIT

Bennett Housman, Arlington, Va., assignor to International Business Machines Corporation, New York, N.Y., a corporation of New York Filed Dec. 31, 1957, Ser. No. 706,403
7 Claims. (Cl. 235—175)

This invention relates to adder circuits and more particularly to adder circuits employing low temperature components.

Materials which are known as superconductors are so termed because of the fact that, when cooled below particular temperatures in the vicinity of absolute zero, they undergo transitions whereby they become essentially perfect conductors, losing all measurable electrical resistance. The phenomenon of superconductivity is treated in detail in such texts as "Superconductivity" by D. Shoenberg, published in 1952 by the Cambridge University Press in London, England and "Superfluids," volume I, by Fritz London, published in 1950 by John Wiley and Sons, Inc. in New York, N.Y. The present invention relates to that aspect of superconductivity referred to as the phenomenon of "trapped flux" or a "frozen-in" field. Such phenomenon is discussed in the aforementioned texts as well as in a paper by J. J. Budnick et al. entitled "Trapped Flux in Impure Superconductive Tin" appearing in the July 15, 1956 issue of the "Physical Review," volume 103, No. 2, pages 286–291 and in a copending U.S. application for a "Multistable Circuit" by James W. Crowe et al., Serial No. 622,902, now Patent No. 2,981,933, filed on November 19, 1956, and assigned to the assignee of the instant application. The trapped flux phenomenon has been observed in superconductor materials under certain conditions when the latter go from their superconductive states to their normal resistive states and back again to their superconductive states. When as a result of lowering its temperature a superconductive substance passes from its normal state to its superconducting state in the presence of an externally applied magnetic field, it becomes a perfect diamagnetic and excludes the applied field entirely except in a thin surface layer. Presumably, during the course of transition from the normal to the superconducting state, multiple connected parts within the substance may develop which have the general form of closed superconducting regions surrounding cores of normal metal. Such cores of normal state will have magnetic flux running through them. The perfect conductivity of the enclosing superconducting regions makes it impossible for this flux to change. The specimen retains a small magnetic moment proportional to the amount of flux trapped in this fashion even after the externally applied field has been reduced to zero. A persistent current in the thin surface layer of the superconductor exists around these cores of normal state so as to maintain the trapped flux. Such cores of normal state are believed to be caused by impurities in the superconductor substance. The effect of such impurities can be attained by actual holes or perforations made in the superconductive substance.

The aforementioned Crowe et al. application employs holes in a superconductive surface as a means for trapping flux, such flux being trapped in a first hole to indicate the storage of a binary "1," and means are provided to cause the trapped flux to be removed from said first hole and appear in a second hole, its appearance in said second hole representing the storage of a binary "0." By providing for each hole a drive winding that is capable of supplying a magnetic field that is sufficient to induce a circulating current in the superconductor which exceeds the critical current of the superconducting area between two holes, one may switch trapped flux from one hole to another hole. Such switching may be employed to create a flip-flop, as will be shown hereinafter, and such flip-flop will become a most useful component in a novel adder.

Consequently it is an object of the present invention to construct a novel adder employing superconductive elements.

A further object is to provide logic circuits utilizing superconductive elements, such logic circuits being particularly applicable to computers.

Yet another object is to provide logic circuits that are particularly adaptable to operation when subjected to temperatures close to absolute zero.

Other objects of the invention will be pointed out in the following description and claims and illustrated in the accompanying drawings which disclose, by way of example, the principle of the invention and the best mode which has been contemplated of applying that principle.

Figures 1, 2, 3, 4, 5, 6, 7:
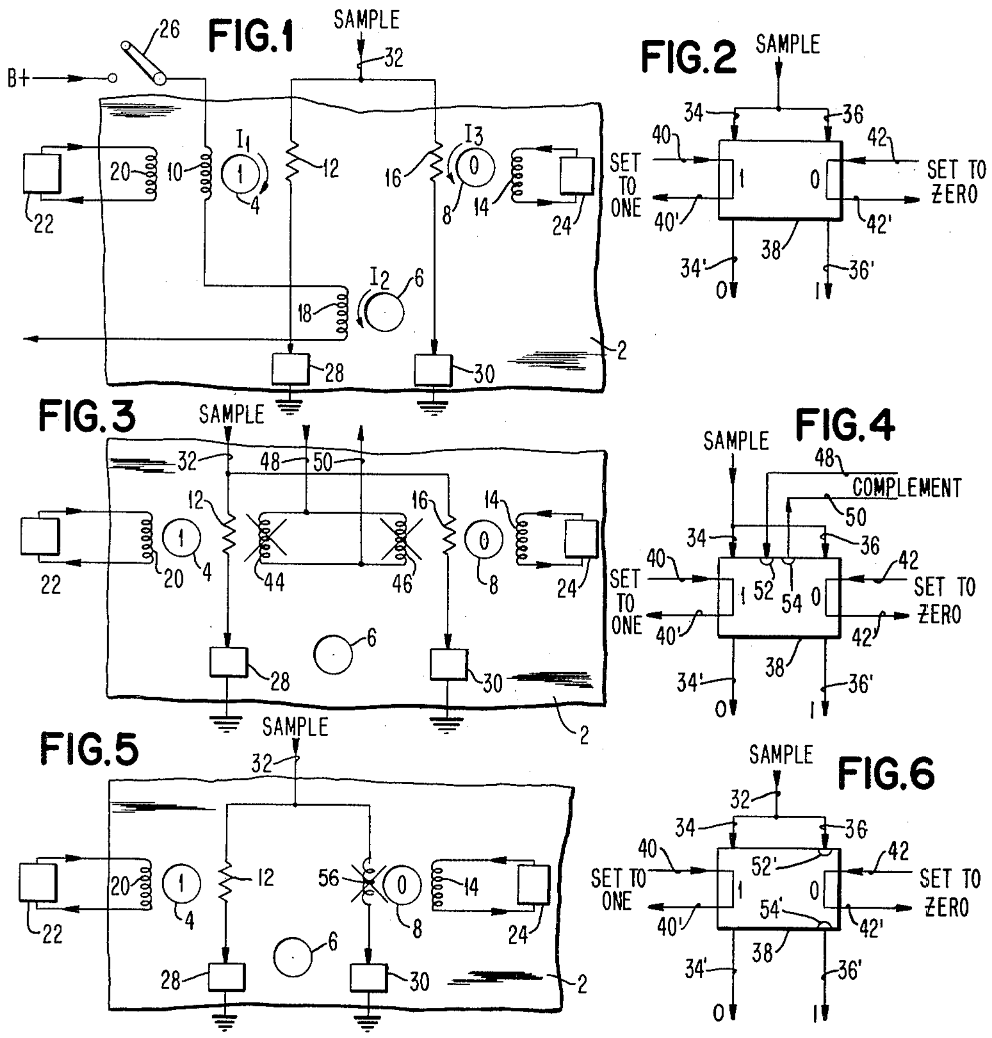
FIG. 1 is an electrical schematic showing of a low temperature flip-flop employed in the adder circuit of this invention and FIG. 2 is a block diagram representation of such flip-flop.
FIG. 3 is the low temperature flip-flop of FIG. 1 modified in a manner that permits successive input signals applied to the same input terminal to successively complement the flip-flop and FIG. 4 is its block diagram representation.
FIG. 5 is an electrical schematic showing of a low temperature flip-flop that always returns to its "0" state after being sensed or sampled and FIG. 6 is its block diagram representation.
FIG. 7 is a truth table setting forth the logic of a full adder.

If a magnetic field is first made to link two normal resistive areas in a thin superconducting film, and then the magnetomotive force supporting that field is removed, a residual magnetic field will remain linking the two areas so as to sustain a superconductive current flow in the thin film around the two areas. This remanent or "trapped" flux may be used as a memory unit, or the trapped flux can be made to switch back and forth between two such specified locations in response to input signals so as to act as a flip-flop. It has been experimentally observed that if a magnetic field has been trapped linking two holes, or two localized areas containing impurities in a superconducting film, by pulsing a drive coil placed over a third hole or localized area of impurity, the flux linking the first two holes can be made to transfer from one of them to the third hole. The result, after the termination of said driving pulse, is the trapping of flux linking the third hole with one of the original two.

The manner in which the flux is trapped is not clearly understood, as yet, but the manifestations of the phenomenon of trapped flux are sufficient and predictable so as to permit one to utilize such phenomenon in a workable device or system. One theory which has attempted to explain trapped flux is the following. Assume a superconductive film of a few microns thick having two holes therein. A "figure 8" coil is placed over the holes, and is adapted, when carrying current therethrough, to produce a magnetic field that attempts to link said holes. This attempt is initially unsuccessful due to an opposing magnetic field established by circulating currents induced in the superconductive film immediately around said holes, such induced circulating currents being the manner in which flux is prevented from penetrating a superconductive material as described in the above identified texts by Shoenberg and London. So long as the circulating currents flowing in the superconducting film between said holes are less than the critical current capacity of said film, the applied magnetic field is prevented from linking said holes by the opposing magnetic field produced by said circulating currents. However, when the circulating currents exceed the critical current of the superconducting film between the holes, the area between the holes will become resistive, the circulating currents will be dissipated due to the resistance, there will be a minute opposing magnetic field, and the applied field will link the two holes. The heat generated by the transition from the superconductive to the normal resistive state and by the circulating currents flowing through the resistive area for a short time will raise the temperature of the area between the holes to a temperature above the critical temperature of the superconducting film so that the latter will remain in the normal resistive state for a short period of time. If the applied current is maintained during that period, the produced magnetic field will remain linking the two holes. After the generated heat is dissipated by the liquid helium surrounding the superconductor and its associated elements, and the film returns to its superconductive state if the applied current is removed, the magnetic field maintained by applied current will attempt to collapse. However, the attempted collapse of the magnetic field will induce circulating currents around the two holes which will maintain the field, thus "trapping" the field linking the two holes.

Turning to FIG. 1, there is shown a thin metallic film 2 which becomes superconductive when immersed in a bath of liquid helium. Holes 4, 6 and 8 are cut out or masked out of film 2. Coupled to hole 4 is a flat spiral coil 10 which normally is wound concentric to such hole 4 and is placed physically directly above or below it. The drawing shows the spiral core 10 to be displaced laterally of the hole 4, such being done for the purpose of simplifying the showing of the invention. A wire 12 is zigzagged across hole 4, such wire 12 being a sense wire and is placed over or under the hole 4. In a similar manner, flat spiral coil 14 and zig-zagged wire 16 are disposed about hole 8 in the manner in which coil 10 and wire 12 are disposed about hole 4.

In series with coil 10 is another coil 18, such coil 18 being wound concentric to hole 6 and located either above or below it. Coupled to hole 4 is set coil 20 which is connected to a suitable source 22 of current for applying a current pulse therethrough to transfer flux to hole 4, whereas coil 14 is also connected to a suitable source of current 24 so as to enable coil 14 to be pulsed to transfer flux to hole 8. A switch 26 may be closed at will so as to permit the application of current through coils 10 and 18. Connected to zig-zagged wire 12 is a load device 28 and a corresponding load device 30 is connected to wire 16. Sampling pulses appear at the input terminal 32, and which branch such pulses take down the parallel paths comprising wire 12, load 28 and wire 16, load 30, respectively, will be determined by whether hole 4 or hole 8 has flux trapped therein. Loads 28 and 30 must provide superconductive paths to ground so that only the resistive states of sense wires 12 and 16 will determine which path the sampling pulse takes.

In describing the operation of the flip-flop illustrated in FIG. 1, it is noted that all the coils 10, 14, 18 and 20 are hard superconductors whereas the sense wires 12 and 16 are soft superconductors. As defined for purposes of practicing the present invention, a hard superconductor is one which will remain in the superconducting state when subjected to magnetic fields of the magnitude normally encountered in the device in which such superconductor is employed, whereas a soft superconductor is one which will become resistive when subjected to those same magnetic fields.

The entire device of FIG. 1 is immersed in a bath of liquid helium, though the immersion of the current sources 22, 24 and B+ supply is optional, so that film 2 and all the coils and zig-zag wires are in the superconductive state. Coils 10 and 18 are wound in a manner that they will establish a magnetic field which links them when switch 26 is closed and current is passed through them. All the operations, including the closing of switch 26, take place while the operating elements are immersed in such liquid helium bath. This magnetic field links holes 4 and 6 in the manner heretofore described. When switch 26 is opened, the magnetomotive force supporting the magnetic flux is removed, flux will be trapped, linking the two holes 4 and 6. The function of coils 10 and 18 is to initially trap flux between holes 4 and 6 so that the low temperature flip-flop may be started. Thereafter, switch 26 is opened and flux is made to switch from hole 4 to hole 8, with hole 6 acting as a pivot point. The application of a current pulse of sufficient magnitude to coil 14 from current source 24 will cause the film 2 between holes 4 and 8 to go normal. As soon as a normal path is established between holes 4 and 8, the closed lines of magnetic flux linking holes 4 and 6 tend to travel through the normal regions established between holes 4 and 8. When the latter change takes place, complete lines of magnetic flux now link holes 6 and 8, the flux in hole 4 disappears, the normal regions between holes 4 and 8 reverting to their superconductive state in the wake of the magnetic lines of flux as the latter progress toward hole 8. Flux now links holes 6 and 8, and by definition, the flip-flop has switched from its "1" state to its "0" state. Subsequently the application of a sufficient current pulse through winding 20 will cause the flux linking holes 6 and 8 to pivot about hole 6 and link holes 4 and 6 when such current pulse has terminated.

Zig-zag elements 12 and 16 are soft superconductors that are used as sensing elements for determining the state of the low temperature flip-flop just described. Each soft superconductor will be driven resistive by the trapped flux threading the hole associated with it; in other words, upon the state of the flip-flop. When a sample pulse is applied at input lead 32, such pulse will pass through soft superconductor 16 to actuate load 30 when flux is threading holes 4 and 6, and it will pass through soft superconductor 12 to actuate load 28 when flux is threading holes 6 and 8. With loads on the output end of the soft superconductors providing at least one superconducting path to ground, the sample pulse appearing at lead 32 will appear on one of the outputs with no loss of power. The zig-zag configuration of the soft superconductors 12 and 16 is for the purpose of preventing, by creating cancelling magnetic fields, the magnetic field generated by the sample current through such soft superconductors from disturbing the state of the flip-flop. Of course the sampling current is chosen so that it does not exceed the limit of self-current that the soft superconductor can tolerate before being driven resistive. A "1" would represent no trapped flux in hole 8 and a "0" would indicate no trapped flux in hole 4.

One theory for explaining the transfer of trapped flux is as follows: Assume initially that flux is trapped through holes 4 and 6. Such flux is maintained by circulating currents $I_1$ and $I_2$ flowing in the direction of the arrows shown in FIG. 1. Through hole 8, one attempts to force a magnetic field in the same direction as the field in hole 4. Since there can be no net flux change through a superconducting film, circulating current $I_3$ will be generated to keep the net flux linkage through hole 8 to zero. The predetermined distance between holes 4 and 8 can carry a finite amount of current, so when $I_1$ plus $I_3$ exceeds this amount, the area between holes 4 and 8 will go into its normal state. Due to this normal state, the current $I_1$ can no longer flow around hole 4 and thus the flux linking hole 4 no longer has a current to maintain it. The flux linking hole 4 cannot collapse since the area of the film 2 between holes 4 and 6 is in the super-conducting state. However, there is a current flowing in coil 14 which will maintain a flux and the area between holes 4 and 8 is in its normal resistive state. The flux linking hole 4 will therefore transfer from hole 4 to hole 8. The net flux through hole 6 during this whole process must remain constant. Thus the field through hole 6, now linked through hole 8, remains constant. The energy taken from the driver 24 was just that amount to move the trapped flux from one hole to the other, plus that energy dissipated in eddy currents.

FIG. 2 is the block diagram representation of the low temperature flip-flop of FIG. 1. The connections to the soft superconductors 12 and 16 are indicated by the vertical lines 34, 34' and 36, 36' respectively, entering and leaving the block near the sides of block 38. The connections to the set coils 20 and 14 are represented by the horizontal lines 40, 40' and 42, 42', respectively, entering and leaving the sides of block 38. It is noted that the representation in FIG. 2 of coils 10 and 18 has been omitted, since such coils are used just to set the flip-flop initially. Where it is desired, there may be more than one sense winding or soft superconductor 12 or 16 associated with a hole if the flip-flop circuit requires more than one output signal to indicate the state of the flip-flop or the process of addition requires such plural sense windings. Similarly, there may be more than one set coil 20 or 14 associated with a hole if desired. A line carrying a sampling pulse passes such pulse through a zig-zag superconductive element such as 12 or 16 so that the state of the flip-flop is not changed by the sampling pulse. But if such sampling pulse is made to pass through a coiled hard superconductor such as coils 10, 14, 18, or 20, then the state of the flip-flop may change if the sampling pulse is of the proper polarity.

FIG. 3 is a circuit diagram of a complementing form of the flip-flop of FIG. 1. A complementing flip-flop is one which changes the state of a flip-flop whenever an input pulse appears at its input terminal. In FIG. 3, as well as in FIG. 5, the coils 10 and 18 for initially trapping flux have been omitted in order to simplify the representation of those embodiments of the invention shown in such figures. Coils 44 and 46 have an X drawn across them to indicate that they are soft superconductors and they provide parallel paths for the complementing input pulse appearing at input lead 48 and exiting through output lead 50. Under steady state conditions of the flip-flop, one of the coils 44 or 46 will be resistive due to presence of trapped flux in its associated hole 4 or 8. When an input pulse appears on lead 48, almost all the current will flow through that coil 44 or 46 which is superconductive. After the flux has been trapped initially by momentarily closing switch 26, the conditions of the two coils 44 and 46 are reversed by such complementing pulses. Subsequent pulses at input lead 48 will complement or cause reversal of state of the flip-flop in the manner described hereinabove.

FIG. 4 is similar to FIG. 2, save that the lines 48 and 50 that are connected to soft superconductors 44 and 46 are indicated by arcs 52 and 54 where such lines 48 and 50 enter and leave block 38 in order to represent a complementing flip-flop.

FIG. 5 is that embodiment of the flip-flop wherein the latter will return to its '0" state after each sampling. This return to "0" after sensing is accomplished by replacing the zig-zag soft superconductor 16 over hole 8 of FIGS. 1 and 3 with a soft superconducting coil 56. Thus, when the low temperature flip-flop is in its "0" state, i.e., flux linking holes 8 and 6, the sample pulse will be passed by the soft zig-zag element 12 which is effectively shorting out the now resistive element 56. Such current passing through zig-zag element 12 will not disturb the state of the flip-flop. However, when the flip-flop is in its "1" state, i.e., flux linking holes 6 and 4 the majority of the sampling current will pass through the soft super-conducting coil 56 and thus will reset the flip-flop to its "0" state. The inductance of the soft superconductor coil 56 is small compared to the resistance of soft superconductor 12 to assure such reset-to-zero state during continuous sensing, otherwise the *L/R* time constant could be too long and would prevent the coil 56 from carrying the full driving pulse during the time interval of said pulse.

The block representation in FIG. 6 of the flip-flop of FIG. 5 is similar to that of FIG. 4 save that arcs 52' and 54' show respectively the points of entry and departure of the sampling pulse in block 38 that are connected to soft superconductor 56. By interchanging the soft superconductor coil 56 and soft superconductor zig-zag element 12, the flip-flop of FIG. 5 can be made to end up in its "1" state after every sampling or sensing operation. Likewise, if the soft superconductive zig-zag element 12 over hole 4 in FIG. 5 is also replaced with a soft superconducting coil, the flip-flop could be complemented when it was sampled.

FIG. 7 represents the truth table of a full adder wherein the X bit may represent the addend, the Y bit the augend, $S_h$ the half adder sum and $C_h$ the half adder carry. The notation IN $C_f$ represents the incoming carry from a previous adder stage, $S_f$ the full adder sum, and OUT $C_f$ the output carry of the full adder which serves as the input carry to the next higher order stage of the full adder. The bar over a letter indicates the absence or the "not" condition of a letter, i.e., $\overline{S}_h$ indicates the absence of the half adder sum, or a half adder sum equal to zero.

By consulting the truth table of FIG. 7, one may formulate certain rules that an adder must comply with in order to carry out binary addition. The problem may be stated as follows: Given $S_h$, $C_h$, and the input $C_f$ for every bit of the adder, how do we adjust the half adder sum $S_h$ to obtain the final sum $S_f$ and what rules must be followed to generate the output $C_f$ (the input $C_f$ to the next stage). From the truth table of FIG. 7, the rules for adjusting $S_h$ to $S_f$ are:

(1) If *IN* $C_f=0$, no adjustment is made in $S_h$.

(2) If *IN* $C_f=1$, $S_h$ is complemented to become $S_f$. No adjustment is made for $C_h$. It is merely sampled to determine the OUT $C_f$. The rules for generating the OUT $C_f$ are as follows:

(3) If *IN* $C_f=0$, merely sample $C_h$ to determine OUT $C_f$.

(4) If *IN* $C_f=1$ and if $S_h=0$ (or $S_f=1$), merely sample $C_h$ to determine OUT $C_f$.

(5) If *IN* $C_f=1$ and if $S_h=1$, then *OUT* $C_f=1$.

Figure 8:
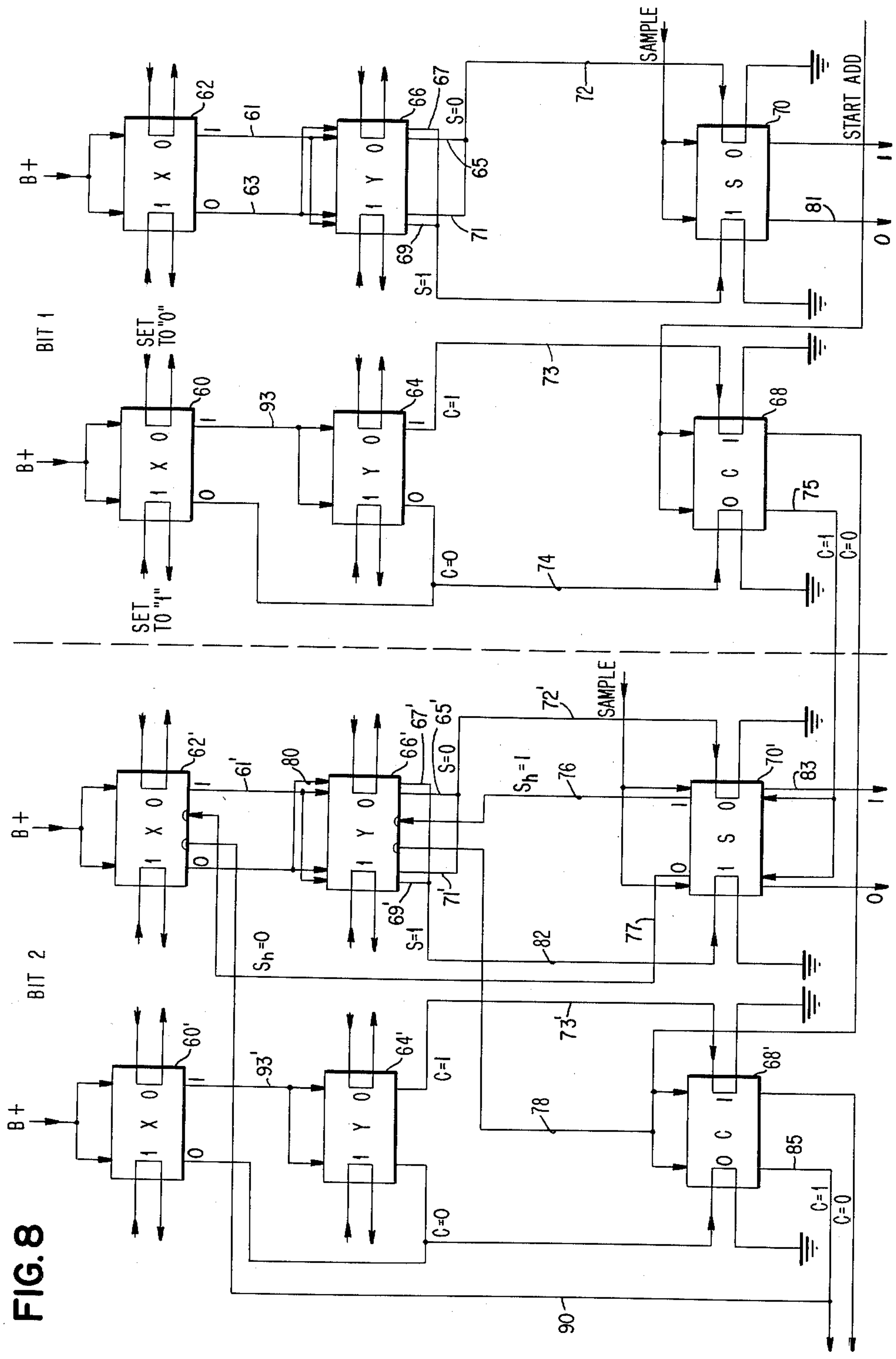
FIG. 8 is a block diagram representation of a low temperature adder forming the instant invention, such block diagram incorporating flip-flops of the types shown in the hereinabove FIGS. 1, 3 and 5.

A lower temperature full adder, utilizing the flip-flops of the type shown in FIGS. 1, 3, and 5, particularly FIGS. 1 and 3, and operating in accordance with the five logical rules delineated hereinabove is shown in FIG. 8. Each bit of each register will be allocated two flip-flops, wherein flip-flop 60 and flip-flop 62 store the least significant binary bit of the X register and flip-flops 64 and 66, respectively, store the least significant binary bit in the Y register. Flip-flop 68 stores the $C_h$ of the least significant bits and flip-flop 70 stores the sum of the least significant bits. Flip-flops 60', 62', 64', 66', 68', and 70' are those flip-flops in the second stage of the adder that are equivalents of those flip-flops in the first stage that have the same numerical identification save for the prime (').

At a given read-in time, all the bits in the X register and all the bits in the Y register are read into the flip-flops marked X and Y by applying pulses to the input circuits labeled SET to "1" or SET to "0". Such input pulses would appear on a coil such as coil 14 or 20 of FIG. 1. The B+ of FIG. 8 represents a steady D.C. current which acts as a sampling current, such sampling current not only sampling the states of the X and Y registers but also setting the carry (68 and 68') flip-flops and sum (70 and 70') flip-flops to their appropriate states in accordance with such constant sampling of the X and Y registers.

Once all the flip-flops have settled down, a pulse is applied at the START ADD line and such pulse samples the carry flip-flop 68 of the lowest order bit, starting a "ripple" type of addition wherein a carry produced in the first stage completes the addition in the second stage and generates the carry of the second stage, and the latter carry, if there be one, operates upon the next stage, and so on down the line until the final sum $S_f$ is obtained. Such final sum $S_f$ can be read out by sampling all the sum flip-flops 70, 70', etc.

It is noted in FIG. 8 that if a carry output from the lowest order carry flip-flop 68 is a "0" then the sum flip-flop 70' of the next higher order in the adder is not affected by such lower order carry flip-flop (Rule 1), and the carry input to the next higher order flip-flop is obtained by merely sampling $C_h$ (flip-flop 68') when $IN\ C_f=0$ (Rule 3).

If the carry output $OUT\ C_f=1$, then the half sum of the next higher order is complemented indirectly, either through the complementing of a Y flip-flop or through the complementing of an X flip-flop. When such complementing takes place, the D.C. B+ current now goes through another path in the complemented X or Y flip-flop to change its corresponding sum flip-flop (Rule 2). The pulse which complements the X or Y flip-flop of a stage also generates the output carry of this stage (Rules 4 and 5).

An example of the binary addition of $$\begin{matrix}1\ 1\\1\ 1\end{matrix}$$

will be given to illustrate the operation of the novel adder. The B+ D.C. level is applied so that a steady current flows through all the flip-flops of the adder, and if all of them were in their respective "0" states to begin with, such direct current will pass through all the S and C flip-flops, setting them to "0," and returning through ground to the B− terminal of the D.C. source of supply.

Both X flip-flops 60 and 62 of the first bit and flip-flops 60' and 62' of the second bit are set to their respective "1" states while Y flip-flops 64, 66, 64' and 66' of the first and second bits are set to their respective "1" states. As soon as such flip-flops settle to their individual "1" states, the steady D.C. current of the first bit traverses "1" output side (line 61) of flip-flop 62 rather than traverse its "0" output side (line 63), the $Y$="1" output line 65 ($Y$="1" output line 67 being connected in series with $X$="0" output line 63), then along line 72 to set half the sum flip-flop 70 to its "0" state. Lines 69 and 71 represent the $Y$="0" output lines of flip-flop 66. Similarly, the D.C. current traverses the $X$="1" output side of flip-flop 60 along line 93 samples augend flip-flop 64 (which is in its "1" state), and exits along line 73 to set half carry flip-flop 68 to its "1" state.

Flip-flops 60' and 62' are set to their respective "1" states, which permits the steady D.C. current to set half sum flip-flop 70' of the second bit to its "0" state and set half carry flip-flop 68' of the second bit to its "1" state. Flip-flop 70' is set to its "0" state because D.C. current is carried along $X$="1" output line 61' of flip-flop 62', such D.C. current sampling flip-flop 66' and existing through $Y$="1" output line 65', and continuing along line 72' to set flip-flop 70' to its "0" state. Since flip-flop 60' has been set to its "1" state, D.C. current traverses flip-flop 60', exiting along $X$="1" output line 93', sampling flip-flop 64' and exiting along output $Y$="1" line 73' to set flip-flop 68' to its "1" state. At this point, flip-flop 70 is in its "0" state, flip-flop 68 is in its "1" state, flip-flop 70' in its "0" state, and flip-flop 68' in its "1" state.

Now that the addend and augend have been entered into the adder, a pulse is applied to the START ADD line, such pulse sampling half carry flip-flop 68 and, finding the latter in its "1" state, produces an output pulse on the $C$=1 line 75. The output pulse along line 75 will sample half-sum flip-flop 70' and, finding the latter in its "0" state, will exit along line 77 to complement flip-flop 62' (changing flip-flop 62' from its "1" state to its "0" state) and produce a carry output pulse to the next stage along line 90. It will be seen that when the START ADD pulse terminates, complemented flip-flop 62' is now in its "0" state so that the steady D.C. current traverses flip-flop 62', exiting along $X$="0" output line, sampling flip-flop 66' (in its "1" state) and exiting along line 67', continuing along line 82 so as to change flip-flop 70' to its "1" state. When the addition is completed, the sum flip-flop 70, 70', etc. are sampled serially or simultaneously to obtain the final sum. In the instant illustration, flip-flop 70 is in the "0" state and flip-flop 70' in the "1" state, the sum 10 representing the two lowest order digits of the final binary sum of 11 and 11.

The present adder is a ripple type adder in that an output carry is generated in a first stage, such carry in turn generates the carry of the second state, the carry pulses rippling through the adder until all the "carries" are completed. In the process of rippling through the adder, the "carries" perform the necessary modifications in the adder circuitry to generate the full adder sum. The length of the START ADD pulse is chosen in accordance with the number of stages in the adder.

It is noted that in the present adder two flip-flops are used per register. Also, in carrying out the addition, in one case, bit X (flip-flop 62') is complemented whereas, at another time, bit Y (flip-flop 66') is complemented by current traversing a sum flip-flop 70' from the carry pulse of a previous stage. This technique of utilizing two different flip-flops per register bit may not be necessary but is used to avoid having too many coils, such as coils 10 and 14 of FIGS. 1 and 3, or too many zig-zag soft superconductors, such as 12 and 16, over a single hole 4 or 8. The employment of too many such elements over a single aperture might lead to unsatisfactory operation. Consequently, two flip-flops per bit were deemed to be more practicable in the ripple type adder shown and described herein.

The employment of a low temperature flip-flop in a novel manner permits an adder to be constructed that is extremely small in size. See the article entitled "Trapped-Flux Superconducting Memory" by J. W. Crowe appearing in volume I, No. 4 of the October, 1957 issue of the IBM Journal of Research and Development," pages 295–303 for the relative dimensions of superconductive film 2, apertures 4, 6 and 8, coils 10, 14, 18 and 20, and zig-zag elements 12 and 16.

I claim:

1. A binary adder for operation at temperatures near absolute zero comprising a plurality of stages wherein each stage comprises a first pair of flip-flops for storing the "addend" bit and a second pair of flip-flops for storing the augend bit, a fifth flip-flop for storing the "sum" of said bits, and a sixth flip-flop for storing the "carry" of said bits, means for obtaining a "0" output signal and a "1" output signal from said sixth flip-flop, said "sum" flip-flop being in a first series circuit with an "addend" flip-flop and an "augend" flip-flop, and the "carry" flip-flop being in a second series circuit with the other "addend" flip-flop and other "augend" flip-flop, means for employing the "1-carry" output of an immediate preceding stage to sense the binary state of said "sum" flip-flop and for employing a "0-carry" output signal of said immediate preceding stage to sense the binary state of said "carry" flip-flop.

2. A binary adder as defined in claim 1 wherein the means for employing the "1-carry" output of an immediate preceding stage to sense the binary state of said "sum" flip-flop also includes means for complementing the states of said "augend" and "addend" flip-flops in series with said "sum" flip-flop, said complementing being mutually exclusive and being responsive to the binary state of said "sum" flip-flop.

3. A binary adder comprising a plurality of stages wherein each stage comprises a first pair of flip-flops for storing the "addend" bit and a second pair of flip-flops for storing the "augend" bit, a fifth flip-flop for storing the "sum" of said bits, and a sixth flip-flop for storing the "carry" of said bits, means for obtaining a "0" output signal and a "1" output signal from said sixth flip-flop, said "sum" flip-flop being in a first series circuit with an "addend" flip-flop and an "augend" flip-flop, said "carry" flip-flop being in a second series circuit with the other "addend" flip-flop and other "augend" flip-flops, means for employing the "1-carry" output signal of an immediate preceding stage to sense the binary state of said "sum" flip-flop and for also complementing the "addend" and "augend" flip-flops in series circuit with said "sum" flip-flop, said complementing being mutually exclusive and in response to the binary state of said "sum" flip-flop so as to produce a "carry" output to the next immediate subsequent stage, and means for sensing said "carry" flip-flop in response to the complementing of said "augend" flip-flop.

4. A binary adder as defined in claim 3 comprising means for automatically resetting the "sum" flip-flop to its new value after either of its associated "addend" and "augend" flip-flops have been complemented.

5. A binary adder as defined in claim 3 wherein the "addend" flip-flop in series circuit with the "sum" flip-flop comprises a superconductive film having at least two apertures therein, means for initially trapping magnetic lines of flux in one aperture to indicate the "1" state of said flip-flop and in the other aperture to indicate the "0" state of said flip-flop, a parallel sensing circuit associated with said apertures wherein each branch of said parallel circuit includes a soft superconductor which goes normal resistive when its corresponding aperture has flux trapped therein, and a source of direct current to be applied to said sensing circuit to sense the state of said "addend" flip-flop.

6. A binary adder as defined in claim 5 wherein an additional parallel circuit is associated with said apertures, said additional circuit including a soft coiled superconductor in each branch of said additional parallel circuit, said coiled soft superconductors becoming normal resistive when either of its associated apertures has flux trapped therein.

7. A binary adder as defined in claim 3 wherein each of the "augend" and "addend" flip-flops in series circuit with the "carry" flip-flop as well as the "carry" flip-flop itself comprise a superconductive film having at least two apertures therein, means for initially trapping magnetic lines of flux in one aperture to indicate the "1" state of the flip-flop and in the other aperture to indicate the "0" state of the flip-flop, a parallel sensing circuit associated with each flip-flop wherein each branch of said parallel sensing circuit includes a soft superconductor which goes normal resistive when its corresponding aperture has flux trapped therein, and a source of direct current to be applied to said parallel sensing circuit for sensing the respective binary states of said flip-flops.

References Cited in the file of this patent

UNITED STATES PATENTS

| | | |
|---|---|---|
| 2,668,661 | Stibitz | Feb. 9, 1954 |
| 2,719,670 | Jacobs et al. | Oct. 4, 1955 |
| 2,832,897 | Buck | Apr. 29, 1958 |

OTHER REFERENCES

"The Summing Point," Automatic Control, August 1956, vol. 5, No. 2, pages 21–23.